T. M. Mitchell.
Mixing App's for Making Fuel.
Nº 92738.   Patented Jul. 20. 1869.

WITNESSES:                                   INVENTOR:

United States Patent Office.

T. M. MITCHELL, OF PHILADELPHIA, PENNSYLVANIA, ASSIGNOR TO "THE ANTHRACITE-FUEL-MANUFACTURING COMPANY, OF PHILADELPHIA."

Letters Patent No. 92,738, dated July 20, 1869.

---

IMPROVED MIXING-APPARATUS FOR PREPARING WASTE COAL FOR FUEL.

---

The Schedule referred to in these Letters Patent and making part of the same.

---

*To all whom it may concern:*

Be it known that I, T. M. MITCHELL, engineer, of the city of Philadelphia, in the State of Pennsylvania, have invented a new and useful Mixing-Machine, for Service in the Process of Utilizing the Waste Coal of the Mines, and for other purposes; and I do hereby declare that the following is a full, clear, and exact description of the same, reference being had to the accompanying two sheets of drawings, making a part of this specification, in which—

Figure 1:
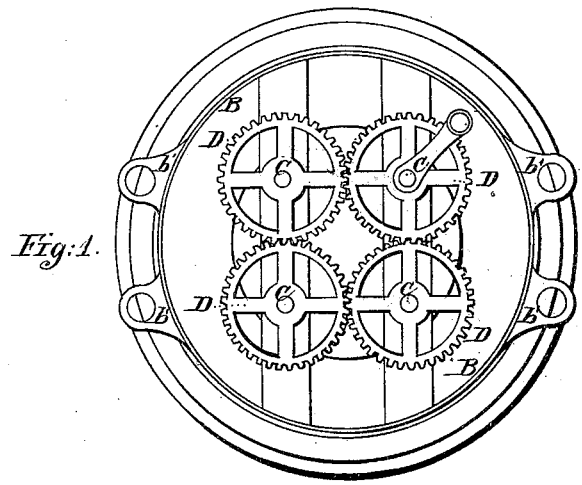
Figure 2:
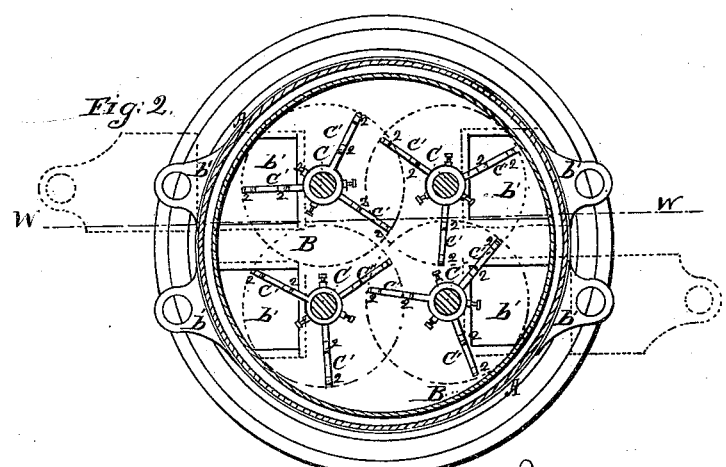

Figure 1 is a plan view of the upper end of the machine;

Figure 2, a horizontal section of the same below the dotted line *v–v* of fig. 3; and Figure 3, a vertical section above the dotted line *w–w* of fig. 2.

Like letters and numbers of reference indicate the same parts when in the different figures.

The nature of my invention consists, substantially as hereinafter described and specified, in the construction and arrangement of a series of vertical shafts, provided with horizontal arms, having vertical projections, and adjustably fixed thereon, the said shafts being arranged, and caused to rotate simultaneously, within a cylindrical upright vessel, having small perforations in its sides, opening into a surrounding steam-jacket, and a series of discharge-openings, fitted with adjustable stoppers or sliding plates in its bottom, all for the purpose of receiving, and thoroughly or intimately mixing, in a hot, moist condition, the purified coal-powder, and the requisite agglutinating-materials, in making artificial fuel and other compounds, and discharging the same, for subsequent condensation or compression.

Referring to the drawings—

A is the steam-jacket surrounding the cylindrical vessel B, and

*b' b'*, the sliding stoppers in the bottom of the said cylinder B.

C C C C, the vertical shafts, and

*c' c'*, the adjustable arms thereon, with their pointed projections 2 2; and

D D D D, the gear-wheels, whereby the simultaneous rotary motions are given to the armed shafts C.

The cylindrical vessel B is made of plate-iron, its top plate having a large opening in its centre, and its bottom plate provided with a series of outlet-openings, fitted with the adjustable valve-plates or slides *b'*, so that the said outlets can be readily closed and opened, as occasion may require.

The sides of the vessel B are perforated with four or more vertical series of small holes, 3 3, for the admission of steam from the steam-jacket A.

Figure 3:
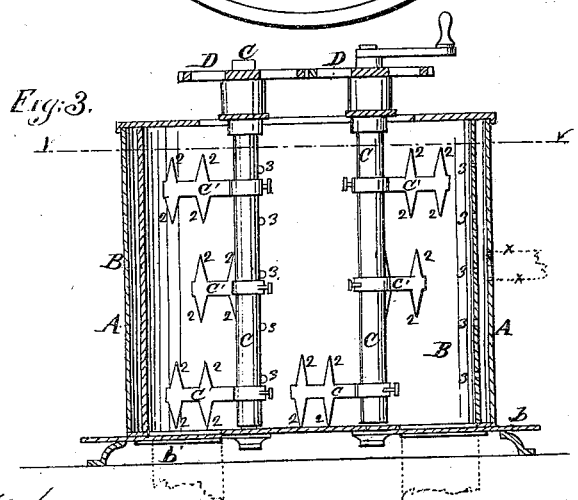

The steam-jacket is a closely-surrounding chamber, into which steam is introduced from any suitable generator, through a steam-conducting pipe, as indicated by the faint lines *x–x* in fig. 3.

The shafts C are arranged, at equal distances apart, around the centre of the vessel, and are supported, so as to rotate therein, in vertical positions, and with their upper ends projecting above the top plate of the vessel B, and are fitted with gear-wheels D, whereby the rotary motion given to one shaft, by any suitable motive-power connected therewith, will give like motions to all the others. (See fig. 1.)

The arms *c' c'* are adjustably fixed on the shafts C, and each arm is provided with four or more pointed, flat, rigid, vertical projections or fingers 2 2, presenting their flat sides in the direction of the circular course in which they are carried around by the arms on the rotating shafts C. (See figs. 2 and 3.)

In the operation of this mixer, in the process of making artificial fuel, the hot plastic mass, consisting of powdered coal and pitch, or rosin, as described in the specification marked "Division C," is run into the vessel B, through the opening in its top plate, the slides *b'*, in its bottom, being closed, and motion given to the shafts C by any suitable motive-power; and at the same time, steam being admitted freely into the jacket A, from any suitable generator, the mass will necessarily soon become thoroughly or most intimately mixed, the steam entering through the several series of the perforations 3 3, and serving to keep the mass hot and more easily worked during the operation of the machine.

The mass having become thoroughly and intimately mixed, the sliding plates *b'* are drawn out, and thus open communication, produced between the interior of the vessel B and the sliding or reciprocating moulds of any suitable condensing-apparatus or press, which moulds are intended to be applied, for the purpose, to the bottom of the said vessel B.

It will be seen that this mixer, operating in connection with the surrounding steam-jacket, as described, will accomplish the object required in the most effectual and rapid manner.

Having thus fully described my invention,

What I claim as new, and desire to secure by Letters Patent, is confined to the following, viz:

1. The mixing-vessel B, in combination with a surrounding steam-jacket, A, opening into the vessel B, through the series of small perforations 3 3, in the sides of the said vessel, substantially as and for the purpose described.

2. In combination with the vessel B, and the steam-jacket A, communicating therewith, as described, I claim the series of armed shafts C C C C, arranged and operating together simultaneously, as and for the purpose described.

3. In combination with the arms *c' c'* of the rotary shafts C C, I claim the pointed, flat, vertical projections or fingers 2 2, arranged to operate substantially as and for the purpose described.

T. M. MITCHELL, *Eng.*

Witnesses:
BENJ. MORISON,
WM. H. MORISON.